(12) United States Patent
Wainscott et al.

(10) Patent No.: US 9,291,193 B2
(45) Date of Patent: Mar. 22, 2016

(54) APPARATUS FOR RETAINING A BALL JOINT, AND AN ASSEMBLY AND A METHOD THEREOF

(71) Applicant: GM GLOBAL TECHNOLOGY OPERATIONS LLC, Detroit, MI (US)

(72) Inventors: Larry E. Wainscott, Algonac, MI (US); Mark Roscoe, Shelby Township, MI (US); Mark R. Gordon, Warren, MI (US)

(73) Assignee: GM Global Technology Operations LLC, Detroit, MI (US)

(*) Notice: Subject to any disclaimer, the term of this patent is extended or adjusted under 35 U.S.C. 154(b) by 211 days.

(21) Appl. No.: 13/941,603

(22) Filed: Jul. 15, 2013

(65) Prior Publication Data

US 2015/0016866 A1 Jan. 15, 2015

(51) Int. Cl.
*F16C 11/06* (2006.01)
*B60Q 1/00* (2006.01)

(52) U.S. Cl.
CPC . *F16C 11/06* (2013.01); *B60Q 1/00* (2013.01); *F16C 11/069* (2013.01); *F16C 11/0623* (2013.01); *F16C 11/0657* (2013.01); *F16C 2362/00* (2013.01); *Y10T 29/49696* (2015.01); *Y10T 403/32196* (2015.01); *Y10T 403/32786* (2015.01)

(58) Field of Classification Search
CPC ............. F16C 11/0623; F16C 11/0657; F16C 11/069; F16C 11/106; Y10T 403/32196; Y10T 403/32565; Y10T 403/32573; Y10T 403/32786; Y10T 403/32795; Y10T 403/32803; Y10T 403/32631; B60Q 2200/32
See application file for complete search history.

(56) References Cited

U.S. PATENT DOCUMENTS

| | | | | |
|---|---|---|---|---|
| 3,776,649 A * | 12/1973 | Kemezys | | 403/90 |
| 3,962,575 A * | 6/1976 | Vandenberg et al. | | 248/340 |
| 4,701,064 A * | 10/1987 | Mizusawa | | 403/71 |
| 4,817,979 A * | 4/1989 | Goettker | | 280/512 |
| 4,974,123 A * | 11/1990 | Luallin et al. | | 362/549 |
| 5,428,511 A * | 6/1995 | Luallin | | B60Q 1/0683 |
| | | | | 362/287 |
| 5,833,383 A * | 11/1998 | Bauman | | 403/122 |
| 6,767,153 B1 * | 7/2004 | Holbrook | | 403/56 |
| 7,029,194 B2 * | 4/2006 | Ishikawa | | F16C 1/105 |
| | | | | 403/193 |
| 7,124,864 B2 * | 10/2006 | Jones et al. | | 188/321.11 |
| 7,219,867 B2 * | 5/2007 | Kalis et al. | | 248/288.31 |
| 7,226,234 B2 * | 6/2007 | Gordy et al. | | 403/344 |
| 8,388,253 B2 * | 3/2013 | McClelland | | 403/61 |
| 2010/0232869 A1 * | 9/2010 | Ditzler | | E02F 9/006 |
| | | | | 403/122 |
| 2011/0036960 A1 * | 2/2011 | Li | | 248/288.31 |
| 2012/0107039 A1 * | 5/2012 | McClelland | | 403/122 |
| 2012/0163010 A1 * | 6/2012 | Wu | | B60Q 1/076 |
| | | | | 362/523 |

* cited by examiner

*Primary Examiner* — Daniel P Stodola
*Assistant Examiner* — Matthew R McMahon
(74) *Attorney, Agent, or Firm* — Quinn Law Group, PLLC

(57) ABSTRACT

An assembly for enabling multi-adjustment of a lamp is provided. The assembly includes a frame to which the lamp is attachable, a ball joint, and an apparatus for retaining the ball joint. The ball joint has a head and a neck. The apparatus is attached to the frame, and includes a housing and a cap. The housing defines a chamber configured to receive the head of the ball joint. The housing may further define a slot in which the neck is slidable such that the ball joint is insertable into and removable from the chamber. The cap is configured to interlock with the housing to secure the ball joint such that they are substantially restricted to rotational movement with respect to each other. The cap and the housing may have retention tabs and retention ridges, respectively, configured to engage with each other to enable the interlocking.

15 Claims, 2 Drawing Sheets

US 9,291,193 B2

APPARATUS FOR RETAINING A BALL JOINT, AND AN ASSEMBLY AND A METHOD THEREOF

TECHNICAL FIELD

The present invention relates to an apparatus for retaining a ball joint, and an assembly and a method thereof.

BACKGROUND

Vehicles include lamps that are adjustable to various angles. Such lamps may include, but are not limited to, reflectors and/or projectors for headlamps, fog lamps, and the like. To enable adjustment and tuning of the lamps to the various angles, many vehicles employ a ball and socket mechanism. In such vehicles, the frame of the lamp may include a socket in which the ball joint fits. The ball joint may, in turn, be attached to a movement mechanism, such as a gear box, to enable the adjustment of the lamp.

SUMMARY

An apparatus for retaining a ball joint is provided. The ball joint generally has a head and a neck, and allows adjustment of a lamp that has a frame. The apparatus includes a housing and a cap. The housing defines a chamber configured to receive the head of the ball joint. The cap is configured to interlock with the housing to secure the ball joint such that the ball joint and the apparatus are substantially restricted to rotational movement with respect to each other. The apparatus is attachable to the frame of the lamp.

An assembly for enabling multi-angle adjustment of a lamp is also provided. The assembly includes a frame to which the lamp is attachable, a ball joint having a head and a neck, and the apparatus described above. The apparatus is attached to the frame. In addition, the apparatus retains the ball joint such that they are substantially restricted to rotational movement with respect to each other, as explained above.

A method for assembling the apparatus, the frame, and the ball joint described above is further provided. The method includes first attaching the housing to the frame. The method then includes inserting the ball joint into the chamber such that the head is within the chamber. The method finally includes interlocking the cap with the housing such that the ball joint and the housing are substantially restricted to rotational movement with respect to each other, as explained above.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Figure 1:
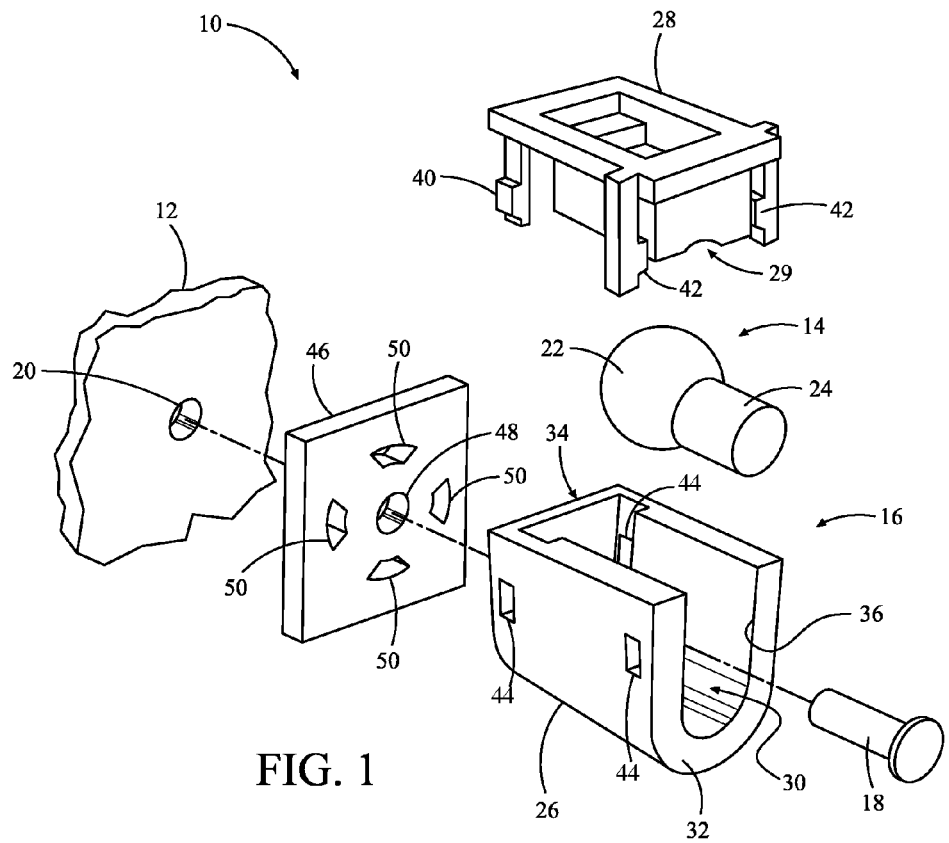
FIG. 1 is a schematic, exploded perspective view drawing of an assembly of a frame, an apparatus, and a ball joint in an unassembled state.

Referring to the drawings, wherein like reference numbers correspond to like or similar components wherever possible throughout the several figures, an assembly 10 for enabling multi-angle adjustment of a lamp (not shown) is shown in an unassembled state in FIG. 1. The lamp may be, but is not limited to, a reflector and/or a projector for a headlamp of a vehicle, a fog lamp, and the like. The assembly 10 includes a frame 12 to which the lamp is attachable, a ball joint 14, and an apparatus 16 for retaining the ball joint 14. The frame 12 may include a fastener hole 20 configured to receive a fastener 18 to secure the apparatus 16 and the frame 12 together.

The ball joint 14 generally includes a head 22 and a neck 24. The head 22 acts as a pivot, thereby enabling the assembly 10, and therefore the lamp, to rotate around multiple axes such that the lamp may be adjusted to multiple angles. The neck 24 may be attached to a movement device or mechanism (not shown), including, but not limited to, a gear box, that controls the rotational movement of the assembly 10.

The apparatus 16 includes a housing 26 and a cap 28. The housing 26 and the cap 28 may be made of a material including, but not limited to, plastic, and may be formed by a molding process.

Figure 2A:
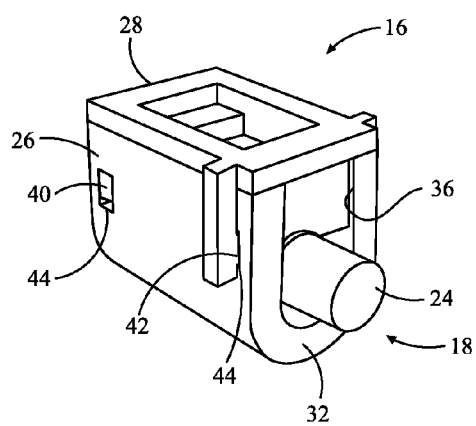
FIGS. 2A and 2B are schematic, perspective view drawings of the apparatus of FIG. 1 retaining the ball joint.
Figure 2B:
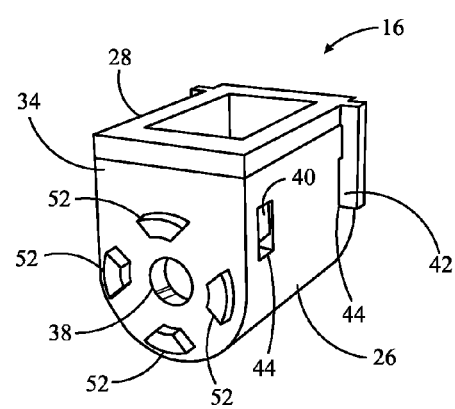

The housing 26 defines a chamber 30 configured to receive the head 22 of the ball joint 14. The housing 26 may include a first end wall 32 and a second end wall 34. The first end wall 32 may define a slot 36 in which the neck 24 of the ball joint 14 is slidable, as seen in FIG. 2A, such that the ball joint 14 may be inserted into and removed from the chamber 30. The second end wall 34 may define a fastener hole 38, as seen in FIG. 2B, configured to receive the fastener 18. The fastener hole 38 is substantially aligned with the fastener hole 20 of the frame 12 such that the fastener 18 may be inserted through both fastener holes 20 and 38 to secure the retention apparatus 16 and the frame 12 together, as explained above. The fastener 18 may be inserted from within the chamber 30.

Figure 3A:
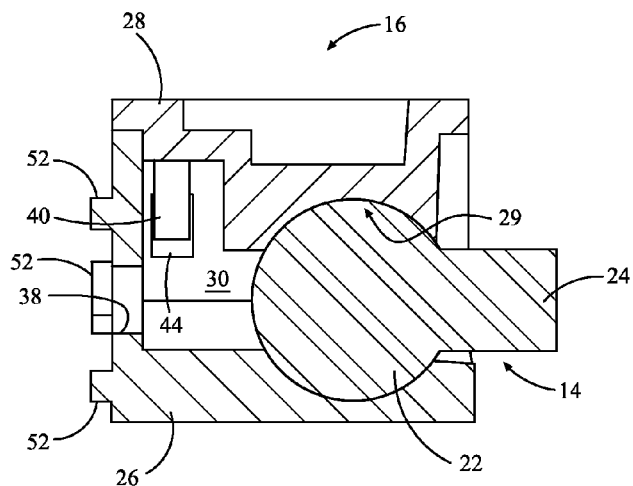
FIGS. 3A, 3B, and 3C are schematic, cross-sectional views of the apparatus and the ball joint of FIGS. 2A and 2B.

The cap 28 is configured to interlock with the housing 26, as seen in FIGS. 2A and 2B, such that the ball joint 14 is substantially prevented from moving in a linear direction, i.e., laterally, longitudinally, and/or vertically. As such, the ball joint 14 and the apparatus 16 are substantially restricted to rotational movement with respect to each other. To accomplish this, the cap 28 may define a concave portion 29 shaped to fit around a portion of the head 22 of the ball joint 14 with a minimal amount of clearance, as seen in FIG. 3A. The cap 28 may also be shaped to maintain a substantially consistent material thickness.

Figure 3B:
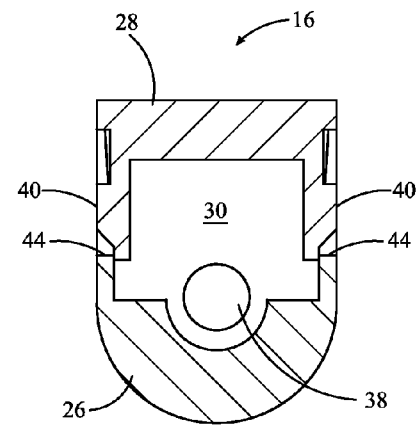
Figure 3C:
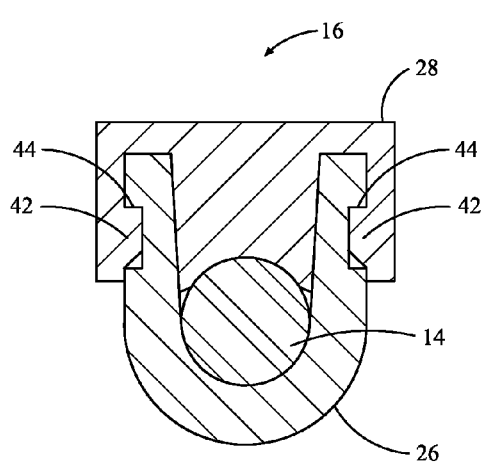

Referring now to FIGS. 3B and 3C, the cap 28 may include interior retention tabs 40 and/or exterior retention tabs 42 configured to engage with retention ridges 44 defined by the housing 26. This enables the cap 28 and the housing 26 to be interlocked without any extraneous components. The interior retention tabs 40 engage with the retention ridges 44 from within the chamber 30, as seen in FIG. 3B. The exterior retention tabs 42 engage with retention ridges 44 from without the housing 26, as seen in FIG. 3C. The retention ridges 44 may be an opening through the housing 26, as seen in FIG. 3B, or an indent in the housing 26, as seen in FIG. 3C. It should be appreciated that the cap 28 may attach to the housing 26 via interior retention tabs 42 only, exterior retention tabs 44 only, or a combination thereof. It should also be appreciated that any other attachment mechanism, including, but not limited to, fasteners, is contemplated.

Referring back to FIG. 1, the assembly 10 may also include an insert 46 located between the apparatus 16 and the frame 12. As with the frame 12 and the apparatus 16, the insert 46 may include a fastener hole 48 configured to receive the fastener 18. The fastener hole 48 is substantially aligned with the fastener holes 20 and 38 of the frame 12 and the apparatus 16, respectively, such that the fastener 18 may be inserted through them to secure the frame 12, the insert 46, and the retention apparatus 16 together.

The insert 46 may also include indents 50 configured to receive and engage with corresponding protrusions 52 extending from the second end wall 34 of the housing 26, as seen in FIG. 2B. This may prevent the housing 26 from rotating when attaching it to the frame 12 via the fastener 18, as described in method 100 hereinafter. The indents 50 and the protrusions 52 also allow the housing 26 to be positioned at different angles with respect to the frame 12. This may be beneficial for assembly purposes, such as providing easier access for attaching the cap 28 to the housing 26. While four indents 50 and protrusions 52 are shown, it should be appreciated that there may be any number of indents 50 and protrusions 52. In addition, while the indents 50 and the protrusions 52 are shown positioned at 0 degrees, 90 degrees, 180 degrees, and 270 degrees, it should further be appreciated that they may be located at any angles and in varying increments.

Figure 4:
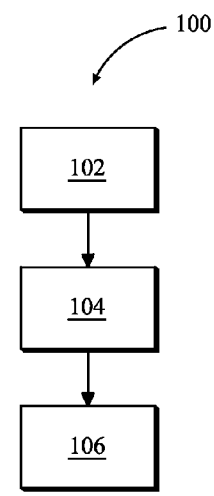
FIG. 4 is a schematic flow diagram illustrating a method of assembling the frame, the apparatus, and the ball joint of FIG. 1.

Referring now to FIG. 4, a method 100 for assembling the frame 12, the ball joint 14, and the apparatus 16 is shown. Method 100 begins at step 102 in which the housing 26 of the apparatus 16 is attached to the frame 12. This may be accomplished by inserting the fastener 18 from within the chamber 30 through the fastener holes 20 and 38 until the housing 26 and the frame 12 are securely attached to each other.

In embodiments in which the assembly 10 includes the insert 46, step 102 may also include positioning the insert 46 between the apparatus 16 and the frame 12 prior to inserting the fastener 18. The insert 46 is positioned such that the indents 50 and the corresponding protrusions 52 of the housing 26 are aligned such that when the fastener 18 is being inserted through the fastener holes 20, 38, and 42, the retention apparatus 16 does not rotate with respect to the frame 12, as explained above.

After step 102, method 100 proceeds to step 104. At step 104, the ball joint 14 is inserted into the chamber 30. This may be achieved by aligning the ball joint 14 with respect to the apparatus 16 such that the head 22 is inserted into the chamber 30 and the neck 24 slides in the slot 36.

After step 104, method 100 proceeds to step 106. At step 106, the cap 28 is attached to the housing 26 to securely hold the ball joint 14 within the chamber 30 such that it does not substantially move in a linear direction, and is substantially restricted to rotational movement, as explained above. In embodiments in which the cap 28 has interior retention tabs 40 and/or exterior retention tabs 42, the attaching of the cap 28 to the housing 26 may include snapping the interior retention tabs 40 and/or the exterior retention tabs 42 into the corresponding receiving retention ridges 44 defined by the housing 26.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An apparatus for retaining a ball joint having a head and a neck, the ball joint allowing adjustment of a lamp having a frame, the apparatus comprising:
   a housing defining a chamber configured to receive the head of the ball joint, wherein the housing includes a first end wall, a second end wall opposite the first end wall, and at least one protrusion extending from the second end wall in a direction away from the first end wall;
   a cap configured to interlock with the housing to secure the ball joint such that the ball joint and the housing are substantially restricted to rotational movement with respect to each other, wherein the cap includes a first cap body and a second cap body coupled to the first cap body, the first cap body is disposed outside the housing, the second cap body is disposed inside the chamber of the housing, the first cap body includes a first outer end wall and a second outer end wall opposite the first outer end wall, the second outer end wall is closer to the second end wall of the housing than to the first end wall of the housing, and the second outer end wall is disposed outside the housing;
   wherein the apparatus is attachable to the frame of the lamp;
   wherein the housing further defines at least one fastener hole extending through the second end wall; and
   an insert configured to be located between the frame and the housing, the insert comprising at least one indent and an insert hole, wherein the at least one indent receives the at least one protrusion of the housing such that the apparatus is substantially restricted from rotating with respect to the insert; and
   a fastener comprising a shank, wherein the shank extends though the at least one fastener hole of the housing and the insert hole such that the fastener couples the housing and the insert together.

2. The apparatus of claim 1 wherein the second cap body defines a concave portion configured to fit around at least a portion of the head of the ball joint.

3. The apparatus of claim 1 wherein the housing further defines a slot in which the neck of the ball joint is slidable such that the head of the ball joint is insertable into and removable from the chamber of the housing.

4. The apparatus of claim 1 wherein the housing further defines at least one opening disposed between the first end wall and the second end wall of the housing, and the cap comprises at least one retention tab partly disposed inside the at least one opening.

5. The apparatus of claim 1, wherein the housing defines an exterior housing surface and an interior housing surface opposite the interior housing surface, the interior housing surface defines the chamber, the housing defining a plurality of openings extending through the interior housing surface and the exterior housing surface, each of the openings is located between the first end wall and the second end wall, the cap includes a plurality of exterior retention tabs extending from the first cap body, each of exterior retention tabs includes an exterior leg and an exterior extension protruding from the exterior leg, each of the exterior legs is disposed outside the housing, and each of the exterior extensions is disposed inside one of the openings.

6. The apparatus of claim 5, wherein the cap further comprises a plurality of interior retention tabs extending from the first cap body, wherein each of the interior retention tabs includes an interior leg and an interior extension protruding from the interior leg, each of the interior legs is disposed inside the housing, and each of the interior extensions is disposed in one of the openings.

7. An assembly for enabling multi-angle adjustment of a lamp, the assembly comprising:
   a frame to which the lamp is attachable, wherein the frame has a frame hole;
   a ball joint having a head and a neck coupled to the head; and
   an apparatus in which the ball joint is retained, the apparatus being attached to the frame and having:
   a housing defining a chamber, wherein the housing defines a housing hole, and the head is disposed inside the chamber; and
   a cap configured to interlock with the housing to secure the ball joint such that the ball joint and the housing are substantially restricted to rotational movement with respect to each other; and
   a fastener partly disposed inside the chamber, wherein the fastener includes a shank; and
   an insert located between the frame and the housing, wherein the insert defines an insert hole, wherein the shank extends through the frame hole, the housing hole, and the insert hole such that the fastener couples the frame, the housing, and the insert together;
   wherein the housing defines an exterior housing surface and an interior housing surface opposite the interior housing surface, the interior housing surface defines the chamber, the housing defining a plurality of openings extending through the interior housing surface and the exterior housing surface, the cap includes a plurality of exterior retention tabs, each of exterior retention tabs includes an exterior leg and an exterior extension protruding from the exterior leg, each of the exterior legs is disposed outside the housing, and each of the exterior extensions is disposed inside one of the openings; and
   wherein the cap further comprises a plurality of interior retention tabs, wherein each of the interior retention tabs includes an interior leg and an interior extension protruding from the interior leg, each of the interior legs is disposed inside the housing, and each of the interior extensions is disposed in one of the openings.

8. The assembly of claim 7 wherein the cap of the apparatus defines a concave portion configured to fit around at least a portion of the head of the ball joint, and the concave portion is disposed inside the chamber of the housing.

9. The assembly of claim 7 wherein the frame hole, the housing hole, and the insert hole are substantially aligned with each other, and the frame is disposed outside the housing.

10. The assembly of claim 7 wherein the housing of the apparatus further defines a slot in which the neck of the ball joint is slidable such that the head of the ball joint is insertable into and removable from the chamber of the housing.

11. The assembly of claim 7 wherein the insert defines at least one indent.

12. The assembly of claim 11 wherein the housing further comprises at least one protrusion disposed inside the at least one indent of the insert such that the apparatus is substantially restricted from rotating with respect to the frame.

13. The assembly of claim 11 wherein the the at least one indent includes a plurality of indents, and the indents are disposed around the insert hole.

14. An assembly comprising:
   a frame including a frame body, wherein the frame defines a frame hole extending through the frame body;
   a ball joint having a head and a neck coupled to the head;
   an apparatus coupled to the ball joint, wherein the apparatus includes:
   a housing including a first end wall and a second end wall opposite the first end wall, wherein the housing defines an open chamber extending from the first end wall to the second end wall, the head is disposed inside the open chamber, the housing has an exterior housing surface and an interior housing surface opposite the exterior housing surface, the interior housing surface defines the open chamber, the housing has an outer surface interconnecting the interior housing surface and the exterior housing surface, the housing defines at least one opening extending through the exterior housing surface and the interior housing surface, and the housing includes at least one protrusion extending from the second end wall in a direction away from the first end wall;
   a cap covering the open chamber, wherein the cap includes a cap body resting on the outer surface such that the cap is partially disposed outside the housing, the cap includes at least one retention tab extending from the cap body, the at least one retention tab includes a retention leg and an extension protruding from the retention leg, the retention leg is disposed outside the housing, and the extension is disposed inside the at least one opening; and
   an insert disposed between the frame and the apparatus, wherein the insert has at least one indent, and the at least one protrusion is disposed in the at least one indent; and
   a fastener partly disposed in the open chamber, wherein the fastener includes a shank, the housing defines a housing hole extending through the second end wall, the insert has an insert hole, and the frame defines a frame hole, and the shank extends through the housing hole, the frame hole, and the insert hole.

15. The assembly of claim 14, wherein the outer surface directly interconnects the interior housing surface and the exterior outer surface, the housing includes a first lateral wall, a second lateral wall, and a curved wall interconnecting the first lateral wall and the second lateral wall, the curved wall is opposite to the outer surface, the first lateral wall is parallel to the second lateral wall, and the shank is parallel to the at least one protrusion.

* * * * *